(12) United States Patent
Booker

(10) Patent No.: US 11,940,039 B2
(45) Date of Patent: **\*Mar. 26, 2024**

(54) ACTUATORS FOR CONVERTING ROTATIONAL INPUT TO AXIAL OUTPUT

(71) Applicant: Danbury Mission Technologies, LLC, Colorado Springs, CO (US)

(72) Inventor: Jesse W. Booker, Fairfield, CT (US)

(73) Assignee: Danbury Mission Technologies, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,024

(22) Filed: Apr. 18, 2022

(65) Prior Publication Data
US 2023/0061197 A1    Mar. 2, 2023

Related U.S. Application Data

(63) Continuation of application No. 16/381,456, filed on Apr. 11, 2019, now Pat. No. 11,306,806.

(51) Int. Cl.
*F16H 49/00* (2006.01)
*F16H 19/06* (2006.01)
(Continued)

(52) U.S. Cl.
CPC .......... *F16H 49/00* (2013.01); *F16H 19/065* (2013.01); *F16H 49/001* (2013.01);
(Continued)

(58) Field of Classification Search
CPC ...... F16H 49/00; F16H 19/065; F16H 49/001; F16H 2049/008; F16H 21/54; G02B 7/1827; G02B 23/00
See application file for complete search history.

(56) References Cited

U.S. PATENT DOCUMENTS

| 2,027,386 A | 1/1936 | Krummer |
| 4,133,215 A | 1/1979 | Norris et al. |
| (Continued) | | |

FOREIGN PATENT DOCUMENTS

| EP | 2980451 | 2/2016 |
| JP | S47-22515 | 7/1972 |
| JP | H07-139519 | 5/1995 |

OTHER PUBLICATIONS

Extended European Search Report in European Application No. EP 19213352.8, dated Jul. 20, 2020, 8 pages.
(Continued)

*Primary Examiner* — Ictor L MacArthur
(74) *Attorney, Agent, or Firm* — Fish & Richardson P.C.

(57) ABSTRACT

An actuator system includes a frame configured to remain stationary relative to a carriage within the frame and connected to the frame by a flexure assembly configured to constrain the carriage for only linear motion along an axis of the actuator system. A rotary base is configured to receive rotational input. Cross-blade flexures operatively connect the carriage to the rotary base, the cross-blade flexures including a plurality of blade flexures and being oriented at an oblique angle to the rotary base and to the axis of the actuator system. A rotary flexure operatively connects the rotary base to the frame. The cross-blade flexures and the rotary flexure are configured to convert rotary motion of the rotary base into linear motion of the carriage and to maintain axial and lateral stiffness.

16 Claims, 3 Drawing Sheets

(51) Int. Cl.
*G02B 7/182* (2021.01)
*G02B 23/00* (2006.01)
(52) U.S. Cl.
CPC .......... *G02B 7/1827* (2013.01); *G02B 23/00* (2013.01); *F16H 2049/008* (2013.01)

(56) References Cited

U.S. PATENT DOCUMENTS

| | | |
|---|---|---|
| 7,231,126 B2 | 6/2007 | Dames |
| 7,992,485 B2 | 8/2011 | Lezock et al. |
| 8,272,650 B2 | 9/2012 | Freund et al. |
| 9,787,157 B2 | 10/2017 | Booker |
| 10,527,189 B2 | 1/2020 | Taya et al. |
| 11,306,806 B2 | 4/2022 | Booker |
| 2010/0212312 A1 | 8/2010 | Rudduck |
| 2011/0130208 A1 | 6/2011 | Freund et al. |
| 2014/0260715 A1 | 9/2014 | Smith et al. |
| 2016/0036293 A1 | 2/2016 | Booker |
| 2017/0242218 A1 | 8/2017 | Booker |
| 2020/0325974 A1 | 10/2020 | Booker |

OTHER PUBLICATIONS

Extended European Search Report in European Application No. EP 22189493.4, dated Dec. 19, 2022, 8 pages.

ACTUATORS FOR CONVERTING ROTATIONAL INPUT TO AXIAL OUTPUT

CROSS-REFERENCE TO RELATED APPLICATION

This patent application is a continuation (and claims the benefit of priority under 35 USC 120) of U.S. patent application Ser. No. 16/381,456, filed Apr. 11, 2019. The disclosure of the prior application is considered part of (and is incorporated by reference in) the disclosure of this application.

BACKGROUND OF THE INVENTION

Field of the Invention

Embodiments of the invention relate to actuators, and more particularly to actuators for use in converting rotational input to linear output.

Description of Related Art

In certain applications, such as optical telescopes/systems, it may be desirable to achieve precise positioning and control of various components. For example, in optical telescopes, it may be important to precisely position mirrors or optical elements over optically large distances in small increments (e.g., on the order of microns or nanometers). The need for precision, among other considerations, drives the design of actuators used in controlling and moving the optical elements. Typically, these requirements are met using a motor and screw design, with the screw being, for example, ball, roller, or lead screws. Such designs include a large number of parts, thereby adding weight and complexity to the overall system.

Such conventional methods and systems have generally been considered satisfactory for their intended purpose. However, there is still a need in the art for improved actuator systems. There is also a need for such systems that are easy to make and use. The present disclosure provides a solution for these needs.

SUMMARY OF THE INVENTION

An actuator system includes a frame configured to remain stationary relative to a carriage within the frame and connected to the frame by a flexure assembly configured to constrain the carriage for only linear motion along an axis of the actuator system. A rotary base is configured to receive rotational input. Cross-blade flexures operatively connect the carriage to the rotary base, the cross-blade flexures including a plurality of blade flexures and being oriented at an oblique angle to the rotary base and to the axis of the actuator system. A rotary flexure operatively connects the rotary base to the frame. The cross-blade flexures and the rotary flexure are configured to convert rotary motion of the rotary base into linear motion of the carriage and to maintain axial and lateral stiffness.

The rotary flexure can include a cruciform set of axially extending blades connecting between the rotary base and the frame configured for rotational flexibility in axial twisting and rigidity against bending. The rotary base, the frame, and the cruciform set of axially extending blades can be monolithic with one another. The frame, flexure assembly, and carriage can be monolithic with one another. The cross-blade flexures can connect to the rotary base and to the carriage through bonded and/or bolted joints for rigid connections.

The flexure assembly can include a plurality of blades flexibly supporting the carriage from the frame. The plurality of blades can provide flexibility for axial movement of the carriage relative to the frame along the axis and provide rigidity in other directions. The flexure assembly can include three arms circumferentially spaced apart from one another. Each arm can have a plurality of the blades flexibly supporting the carriage from the frame. The flexure assembly can have a rotational stiffness greater than that of the cross-blade flexures.

A motor section can be connected to the rotary base. The motor section can include a stepper motor operatively connected to drive rotation of the rotary base. The motor section can include a first harmonic drive connected to the stepper motor. A second harmonic drive can connect between the first harmonic drive and the rotary base. The first harmonic drive can include a transmission for reducing rotary input from the stepper motor by a first factor. The second harmonic drive can include a transmission for reducing rotary input from the first harmonic drive by a second factor.

A connector shaft can be coupled to the carriage, wherein the connector shaft passes through a bore through the frame for outputting linear motion. An optical element can be coupled to the carriage for adjustment of the optical element using linear output from the carriage.

An optical system can include an optical element and a plurality of actuator systems, each as described above, operatively connected to the optical element to control positioning of the optical element. The optical element can include at least one of: a lens and/or a mirror.

A method of positioning an optical element in an optical system includes rotating a rotary base, converting rotational movement of the rotary base into linear movement through actuation of a cross-blade flexure and a rotary flexure, and moving a carriage in an axial direction relative to a housing using linear movement from the cross-blade flexure. The rotary flexure can include a cruciform set of axially extending blades connecting between the rotary base and the housing, and converting rotational movement can include twisting the cruciform set of axially extending blades about an axis while constraining against bending of the rotary flexure about the axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
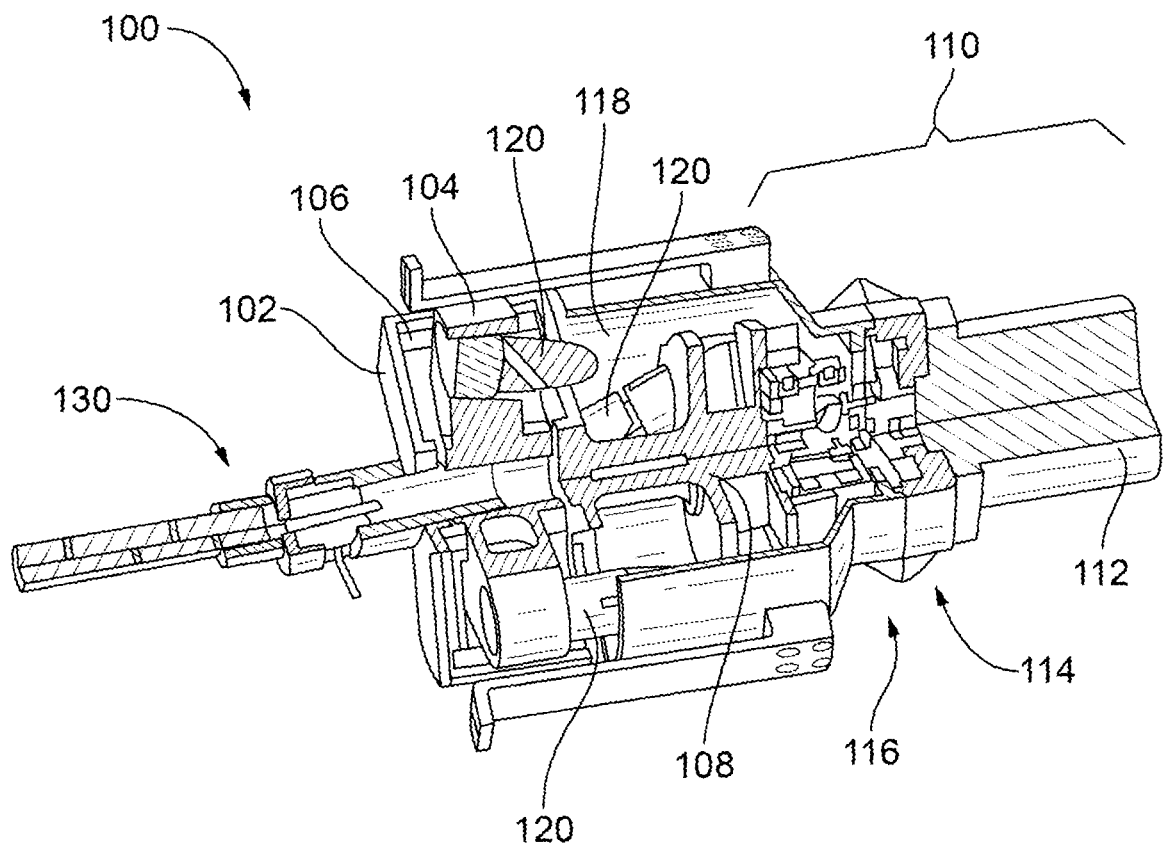
FIG. 1 is a partially cross-sectional perspective view of an embodiment of an actuator system constructed in accordance with the present disclosure, showing the motor section, the rotary base, the frame, and the flexure assembly connected to the carriage.

Reference will now be made to the drawings wherein like reference numerals identify similar structural features or aspects of the subject disclosure. For purposes of explanation and illustration, and not limitation, a partial view of an embodiment of an actuator system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide large distance actuation, e.g., on the order of millimeters, with fine distance resolution, e.g., on the order of microns or nanometers, such as for use in positioning optical elements like lenses and mirrors in optical systems.

The actuator system 100 includes a frame 102 configured to remain stationary relative to a carriage 104 within the frame 102 and connected to the frame 102 by a stacked-blade flexure assembly 106 (best seen in FIG. 2) configured to constrain the carriage 104 for only linear motion along an axis A of the actuator system 100. A rotary base 108 is configured to receive rotational input from a motor section 110 that is connected to the rotary base 108. The motor section 110 includes a stepper motor 112 operatively connected to drive rotation of the rotary base 108. The motor section 110 includes a first harmonic drive 114 connected to the stepper motor. A second harmonic drive 116 connects between the first harmonic drive 114 and the rotary base 108. The first harmonic drive 114 includes a transmission for reducing rotary input from the stepper motor 112 by a first factor. The second harmonic drive 116 includes a transmission for reducing rotary input from the first harmonic drive 114 by a second factor.

Figure 2:
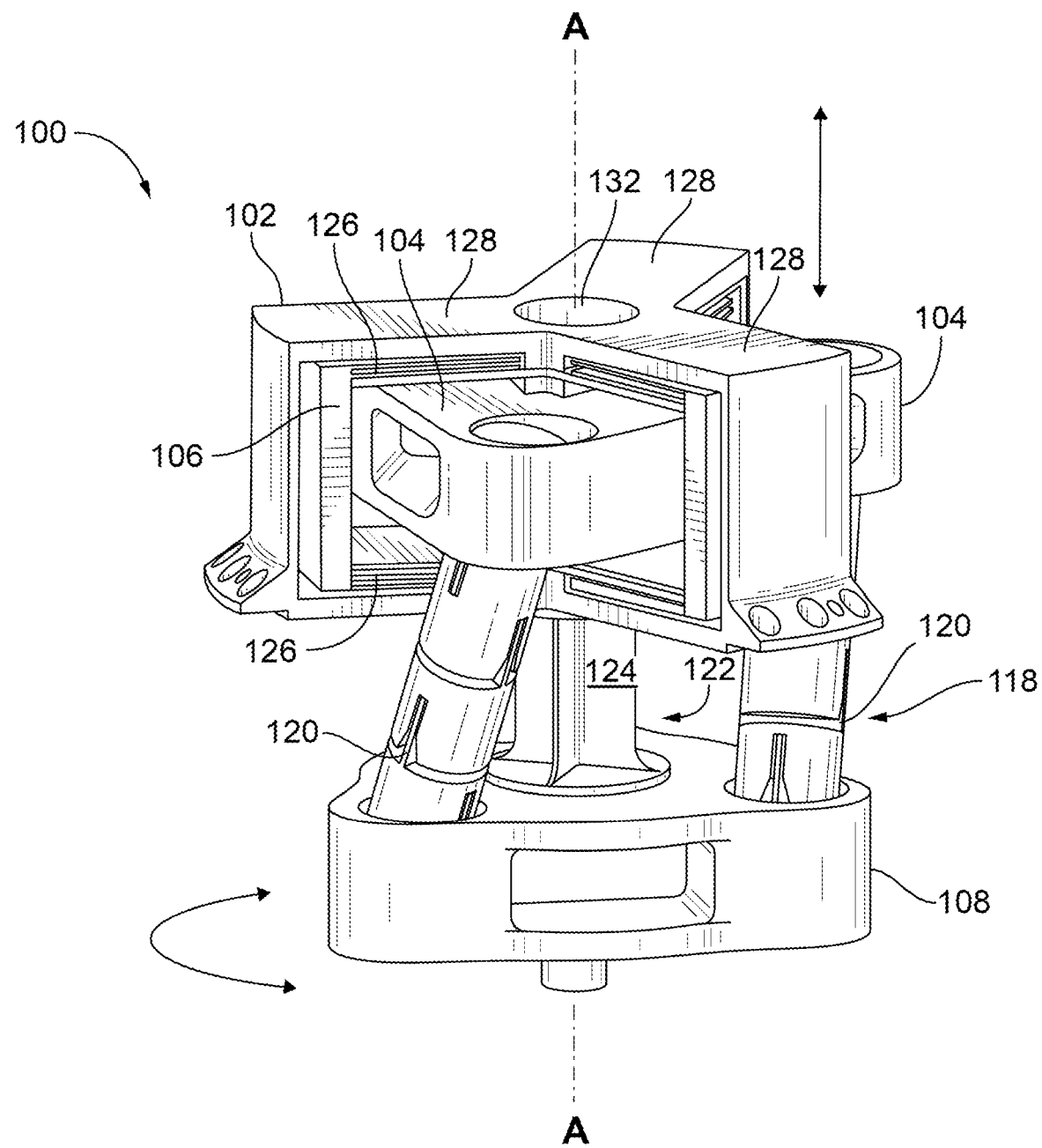
FIG. 2 is a perspective view of a portion of the actuator system of FIG. 1, showing the frame, carriage, helical flexure, and the rotary base.

With reference now to FIG. 2, three cross-blade flexures 118 operatively connect the carriage 104 to the rotary base 108. The cross-blade flexures 118 are each composed of four blade flexures 120 oriented perpendicular to one another along the length of each cross-blade flexure 118. The cross-blade flexures 118 are at an oblique angle to the rotary base 108 and to the axis A of the actuator system 100. A cruciform flexure 122 operatively connects the rotary base 108 to the frame 102. The cross-blade flexures 118 and the cruciform flexure 122 are configured to convert rotary motion (indicated by the curved double arrow in FIG. 2) of the rotary base 108 into linear motion (indicated by the straight double arrow in FIG. 2) of the carriage 104. Furthermore, the mechanism comprising the rotary base 108, the cross-blade and cruciform flexures 118, 122, the stacked blade flexure assembly 106, the frame 102, and the carriage 104 maintain axial and lateral stiffness when held in place by the motor section 110.

The cruciform flexure 122 includes a set of four axially extending blades 124 (only the front three of which are visible as viewed in FIG. 2, but the fourth of which is evenly spaced in the circumferential direction with the other three) connecting between the rotary base 108 and the frame 104 configured for rotational flexibility about the axis A and rigidity against of axis bending relative to the axis A of the cruciform flexure 122. The rotary base 108, the frame 102, the carriage 104, the stacked blade flexures 106, and the cruciform flexure 122 can be monolithic with one another and can be fabricated either by electrical discharge machining (EDM), additive manufacturing (AM), and/or by any other suitable technique. The cross-blade flexures 120 connect to the rotary base 108 and to the carriage 104 through bonded and/or bolted joints for rigid connections. The combination of the elements described above, specifically 120, 108, 102, 106, 122, and 104 can convert rotating motion from the base 108 to linear output at the carriage 104 with zero or nearly zero mechanical play in the mechanism.

The stacked-blade flexure assembly 106 includes a plurality of parallel blades 126, each oriented normal to the axis A, flexibly supporting the carriage 104 from the frame 102. Some of the blades 126 connect between the carriage 104 and the frame 102 from above the carriage 104 as oriented in FIG. 2, and some of the blades connect between the carriage 104 and the frame 102 from below the carriage 104 as oriented in FIG. 2. The plurality of blades 126 are monolithic with the carriage 104 and the frame 102 and provide flexibility for axial movement of the carriage 104 relative to the frame 102 along the axis A and provide rigidity in other directions. The stacked-blade flexure assembly 106 includes three arms aligned with the three arms 128 of the frame 102, each of the arms of the flexure assembly being circumferentially spaced apart from one another and each arm having a plurality of the blades 126 flexibly supporting the carriage 104 from the frame 102. The stacked-blade flexure assembly 106 has a rotational stiffness greater than that of the cross-blade flexures 120.

Figure 3:
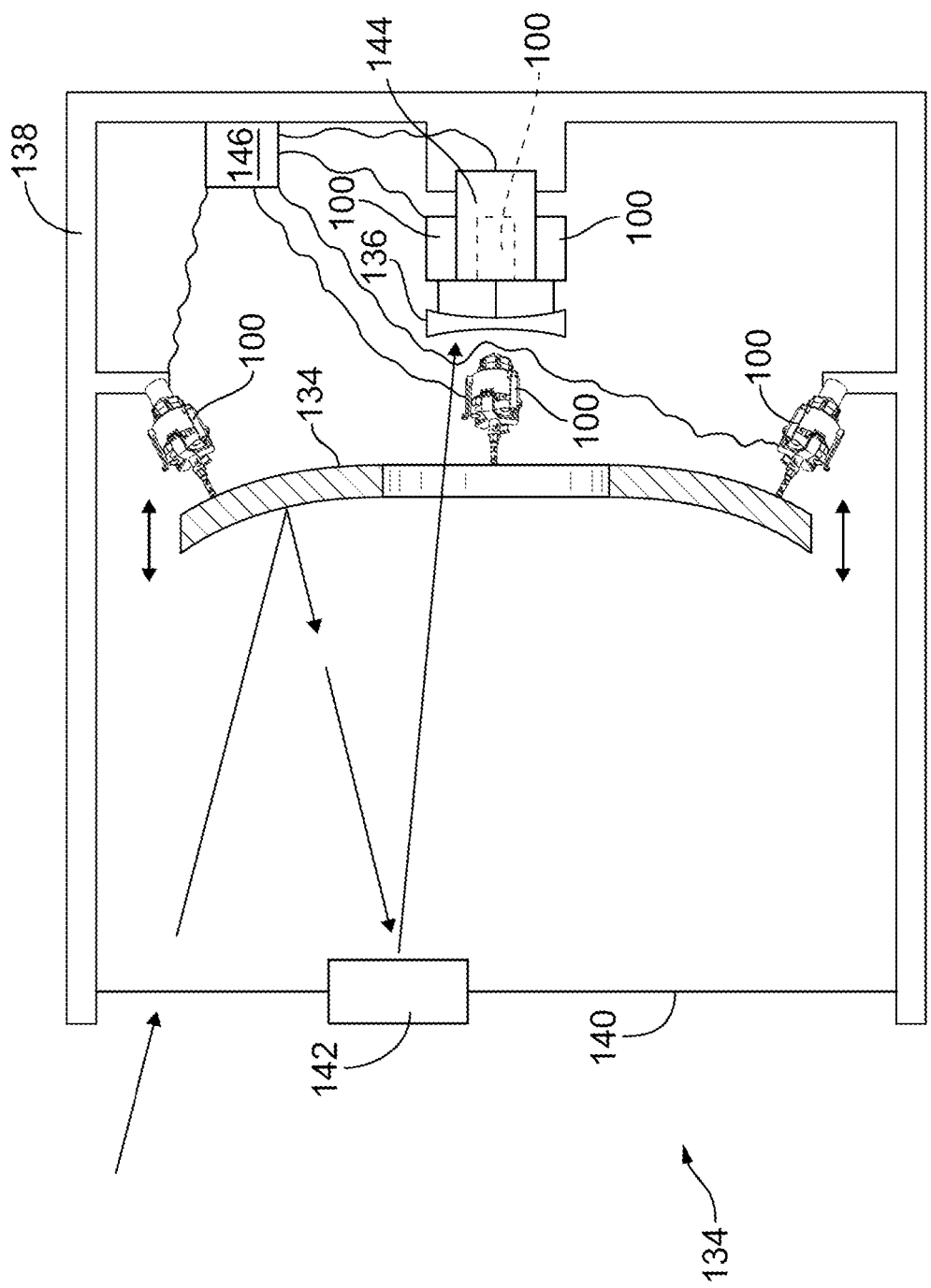
FIG. 3 is a schematic cross-sectional elevation view of an embodiment of an optical system constructed in accordance with the present disclosure, showing a mirror and a lens actuated by multiple actuator systems of FIG. 1.

Referring again to FIG. 1, a connector shaft 130 is coupled to the carriage 104. The connector shaft 130 passes through a bore 132 through the frame 102 (identified in FIG. 2) for outputting linear motion. With reference now to FIG. 3, an optical system 134 such as a telescope, a beam expander, or the like, includes one or more optical elements, such as a lens 136, mirror 134, or the like, and a plurality of actuator systems 100, each as described above, connecting between a frame 138 and the optical elements 134, 136. The ray arrows in FIG. 3 schematically indicate light passing through a window 140, off of a primary mirror 134, a secondary mirror 142, through the lens 136 and into an imaging sensor 144.

The actuator systems 100 are each operatively connected to their respective optical element 134, 136 to control positioning of the optical element 134, 136. Three or more actuator systems 100 can control positioning of the mirror 134, and three or more actuator systems 100 can control positioning of the lens 136. Those skilled in the art will readily appreciate that any other suitable arrangement of optical elements and actuator systems can be arranged without departing from the scope of this disclosure. Each optical element 136, 134 is coupled to the carriages of its respective actuator systems 100 through the respective connector shafts 130 (identified in FIG. 1) for adjustment of the optical element position using linear output from the carriages 104 (identified in FIG. 1). A controller 146 can be connected to the actuator systems 100 to provide coordinated control of the position of the optical elements 134, 136, e.g., based on feedback such as from the imaging sensor 144.

Using flexures instead of traditional mechanisms such as rolling or sliding surfaces can eliminate friction as well as the associated backlash and hysteresis. There are no wear components in flexures, which increases life and reliability, and no lubricants are required in flexures. Monolithic construction reduces part count and helps eliminate play in the mechanism. Systems as disclosed herein have a high axial stiffness and high lateral stiffness compared to traditional systems.

The methods and systems of the present disclosure, as described above and shown in the drawings, provide for actuator systems with superior properties including large distance actuation, e.g., on the order of millimeters, with fine distance resolution, e.g., on the order of microns or nanometers. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An actuator system, comprising:
a frame coupled to a base by a rotary flexure;
a carriage positioned within the frame and configured to move parallel to an axis of the frame independently of the frame;
a plurality of cross-blade flexures connected between the base and the carriage, and oriented at an angle to the base and to the axis of the frame; and
a shaft connected to the carriage and extending through an aperture in the frame,
wherein the cross-blade flexures and rotary flexure are configured to convert rotary motion of the base into a translation of the carriage in a direction parallel to the axis of the frame.

2. The system of claim 1, further comprising a flexure assembly configured to constrain the carriage against rotation about the axis of the frame.

3. The system of claim 2, wherein the flexure assembly comprises a plurality of parallel blades.

4. The system of claim 3, wherein one or more of the plurality of parallel blades are positioned between a top surface of the carriage and the frame, and one or more of the plurality of parallel blades are positioned between a bottom surface of the carriage and the frame.

5. The system of claim 3, wherein the frame comprises a plurality of arms extending radially with respect to the axis of the frame.

6. The system of claim 5, wherein the flexure assembly comprises a plurality of arms extending radially with respect to the axis of the frame.

7. The system of claim 6, wherein the arms of the flexure assembly are aligned with the arms of the frame.

8. The system of claim 7, wherein one or more of the plurality of parallel blades are positioned between each aligned arm of the frame and arm of the flexure assembly.

9. The system of claim 1, wherein the rotary flexure comprises a plurality of blades that extend in a radial direction relative to the axis of the frame.

10. The system of claim 1, wherein the plurality of blades comprises at least 4 blades.

11. The system of claim 1, wherein the cross-blade flexures each comprise a plurality of blade flexures, and wherein each blade flexure is oriented orthogonally with respect to adjacent blade flexures in each cross-blade flexure.

12. The system of claim 11, wherein each cross-blade flexure comprises at least four blade flexures.

13. The system of claim 1, wherein the plurality of cross-blade flexures comprises at least three cross-blade flexures.

14. The system of claim 1, wherein the base, the frame, and the rotary flexure are formed as a monolithic element.

15. An optical assembly, comprising:
an optical element; and
the actuator system of claim 2 connected to the optical element through the shaft.

16. The optical assembly of claim 15, further comprising at least one additional actuator system, wherein the optical element is connected to at least two different ones of the actuator systems to apply forces to the optical element in different directions.

* * * * *